May 23, 1967 W. H. GROLL 3,321,095
REMOVABLE LOAD SUPPORTING RACK FOR AUTOMOBILES
Filed May 3, 1966 3 Sheets-Sheet 1

*INVENTOR.*
WALTER H. GROLL
BY *George Raynovich*
HIS ATTORNEY

May 23, 1967 W. H. GROLL 3,321,095
REMOVABLE LOAD SUPPORTING RACK FOR AUTOMOBILES
Filed May 3, 1966 3 Sheets-Sheet 2

INVENTOR.
WALTER H. GROLL
BY
HIS ATTORNEY

May 23, 1967 W. H. GROLL 3,321,095
REMOVABLE LOAD SUPPORTING RACK FOR AUTOMOBILES
Filed May 3, 1966 3 Sheets-Sheet 3

INVENTOR.
WALTER H. GROLL
BY George Raymovich
HIS ATTORNEY

3,321,095
REMOVABLE LOAD SUPPORTING RACK FOR AUTOMOBILES
Walter H. Groll, 522 Parkwood Road,
Pittsburgh, Pa. 15210
Filed May 3, 1966, Ser. No. 547,279
10 Claims. (Cl. 214—450)

The present invention relates to a removable load supporting rack for automobiles, and more particularly to a load supporting rack of which no portion is supported by the automobile roof so that the rack may be utilized with convertibles, as well as conventional steel-roofed automobiles.

With the develpoment of modern passenger automobiles, various devices have been utilized for supporting loads externally of the automobile during unusual circumstances such as when the occupants of the automobile are taking long trips, or have excess baggage or other types of loads. Another time when an external carrier is often utilized on an automobile is to carry a boat or a surfboard to the shore.

In all earlier racks for automobiles, the load carrying members, or at least some of them, were fixed to the roof of the automobile so that they could be used only with steel-roofed, or hardtop automobiles. Thus, a person owning a convertible automobile in which the cloth roof can be retracted, could not utilize the load carrying rack. This was a particular hardship on many sportsmen, since a sportsman who would be likely to want to carry a boat or a surfboard on an external rack on an automobile was also the very person who would be likely to purchase a convertible automobile which gave him access to the air and sun.

In addition to the fact that earlier load carrying racks for automobiles could not be utilized with convertibles, the earlier racks were often difficult to install on the automobile and, when installed, were often difficult to remove. Some racks took the form of a permanent fixture on the automobile on which they were installed.

With the rack of my invention, a person can readily install and remove the rack from his automobile in a matter of a few minutes. Further, if the person has a convertible automobile, the rack can be utilized with the roof of the automobile either in the raised position or in the lowered position and, in fact, the roof can be raised and lowered with the rack in place.

The rack of my invention consists of two upright frame members which are the load bearing frames of the rack. These frame members are maintained in an upright position by tension members that are strong longitudinally between the ends of the automobile and which hold the upright frame members.

To particularly facilitate the use of my rack with a boat or a surfboard, I have provided a boat loader which makes the loading of a relatively large and heavy boat onto the rack a simple proposition. Further, I have provided my rack with boat clamps which can keep the boat clamped to the rack very easily and without the difficulty of installing any special devices on the boat, or without using any rope that could become loose and also would be difficult to fasten.

With the foregoing considerations in mind, it is an object of my invention to provide an improved, removable, load supporting rack for automobiles.

Another object of my invention is to provide a load supporting rack for automobiles which can be utilized with cloth-roofed convertible automobiles as well as with steel-roofed automobiles.

Another object of my invention is to provide a load supporting rack for automobiles in which no portion of the rack is supported by the automobile roof.

Another object of my invention is to provide a load supporting rack for automobiles in which the roof of a convertible automobile can be raised and lowered while the rack is installed on the automobile.

Another object of the present invention is to provide a load supporting rack for automobiles which is readily installed on the automobile and removed therefrom.

These and other objects of the present invention will become apparent as this description proceeds in conjunction with the accompanying drawings.

Figure 1:
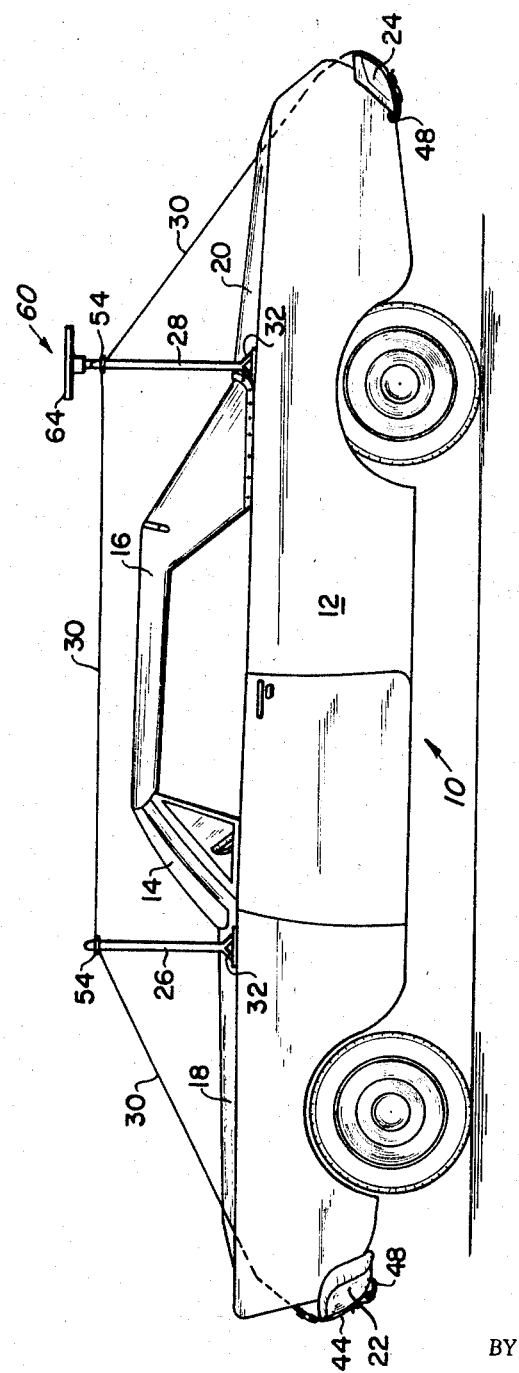
FIGURE 1 is a side elevational view of an automobile having the removable load supporting rack of the present invention installed thereon.

Referring to the drawings, and particularly to FIGURE 1, there is shown a conventional convertible automobile 10. The automobile, as is standard with most automobiles, has a body 12, a windshield 14 extending upwardly from the body, a roof 16, a front deck lid 18, and a rear deck lid 20. At the front end of the automobile is positioned a front bumper 22 and at the rear end of the automobile is positioned a rear bumper 24.

Figure 2:
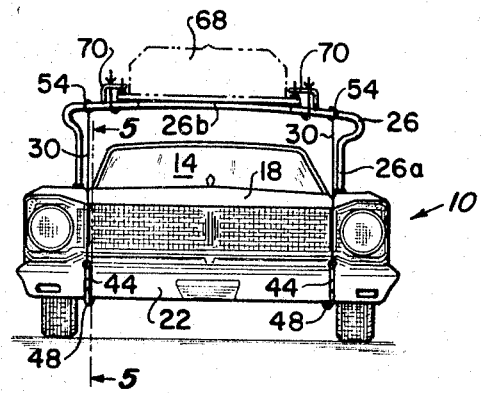
FIGURE 2 is a front elevational view of the automobile of FIGURE 1 with the convertible roof in the lowered position.

The rack of the present invention has a front weight-bearing frame 26 which is positioned on the automobile forwardly of the windshield 14. As best shown in FIGURE 2, the front frame 26 has two uprights 26a connected by a cross member 26b.

The rack also has a rear weight-bearing frame 28 that is positioned rearwardly of the automobile roof 16 on the automobile body 12. The rear frame 28 has two uprights 28a connected by a cross member 28b as best seen in FIGURE 3.

As shown in FIGURE 1, the weight-bearing frames 26 and 28 are connected to each other and to the front bumper 22 and rear bumper 24, respectively, by the tension members 30 in a manner to be explained hereinafter in detail. The front weight-bearing frame 26 and the rear weight bearing frame 28 are preferably formed of tubular material which is shaped as shown to form the frames. The frames 26 and 28 are positioned on the automobile body 12 and the contact feet 32 between the respective uprights 26a and 28a of the frames 26 and 28 are shown in detail in FIGURE 4.

Figure 4:
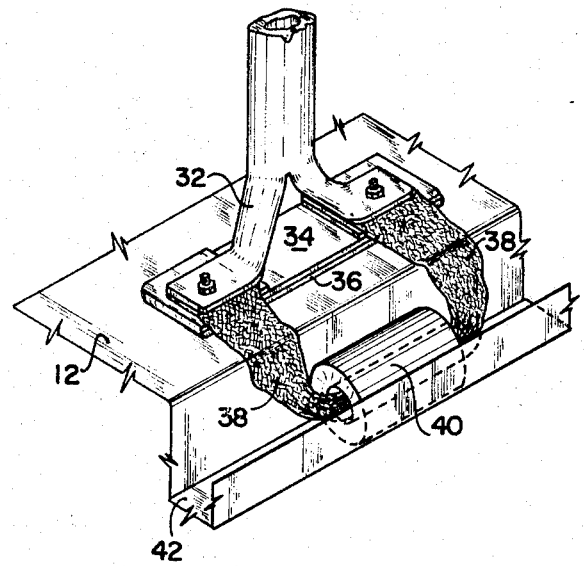
FIGURE 4 is a perspective view, to an enlarged scale, of one foot of the upright frames of the load supporting rack of the present invention.
Figure 5:
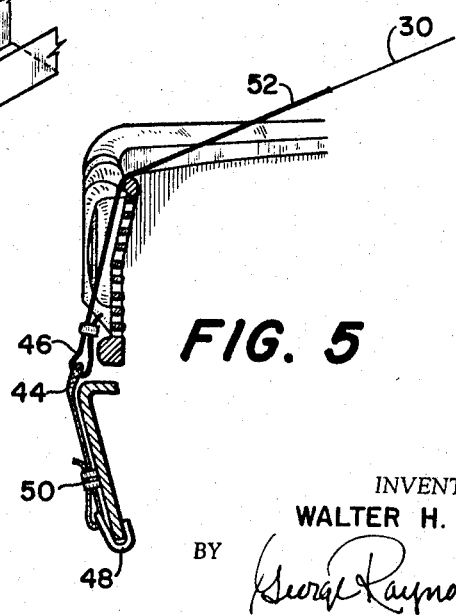
FIGURE 5 is a fragmentary sectional view, to an enlarged scale, of a portion of the front of the automobile taken along line 5—5 of FIGURE 2.

As shown in FIGURE 4, the feet 32 are formed by splitting the ends of the tubular frames 26 and 28 and bolting the split end of the frame to a plate 34. The plate 34 has a resilient traction pad 36 fastened thereto so that the traction pad contacts the surface of the automobile body 12. Attached to the feet 32 are belt webbings 38 which are bolted between the plate 34 and the split end of the tubing as shown in FIGURE 4. The belt webbings 38 are each threaded through a flexible anchor 40 which is preferably formed of flexible tubing having a relatively thick wall.

Figure 3:
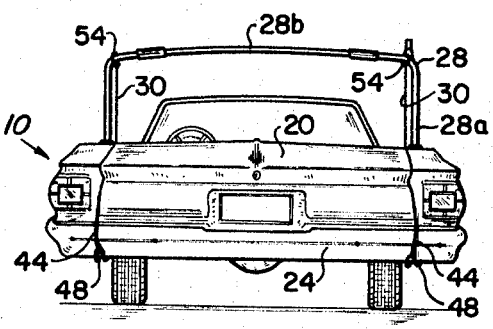
FIGURE 3 is a rear elevational view of the automobile of FIGURE 1 with the cloth roof of the automobile in the lowered position.

As best seen in FIGURES 2 and 3, the front frame 26 and the rear frame 28 are so positioned that the feet 32 (a total of four) are positioned on the automobile body 12 immediately outboard of the opening for the front deck lid 18 and the rear deck lid 20. The front frame 26 and the rear frame 28 are initially positioned while the front deck lid 18 and the rear deck lid 20 are opened so that the rain channels 42 (FIGURE 4) which surround each of the deck lids on most conventional automobiles are exposed.

When the feet 32 are positioned, the flexible anchor 40 is placed within the respective rain channel 42 so that when the deck lid is again closed, the anchor 40 will be held captive within the rain channel 42 so that the front and rear frames 26 and 28 are removably fixed in position to the automobile body.

As best seen in FIGURES 1, 2, 3 and 5, the front weight-bearing frame 26 and the rear weight-bearing frame 28 are maintained in the upright position by tension members 30. The tension members 30 are preferably formed of flexible steel cable and have eyes 46 formed on each end thereof. The eyes 46 receive belt webbing 44 which is permanently fixed to the eyes 46 of the tension members 30 and which forms part of the tension member 30. The belt webbing 44 passes through hooks 48 on front ends only. At the rear, tension member 30 is fastened directly to hooks 48. At the front, members 30 and the belt webbing 44 is provided with buckles 50 which permit the length of the belt webbing 44 between the eyes 46 of the tension member 30 and the hooks 48 on the end thereof to be adjusted so that the tension on tension members 30 can be adjusted.

Figure 6:
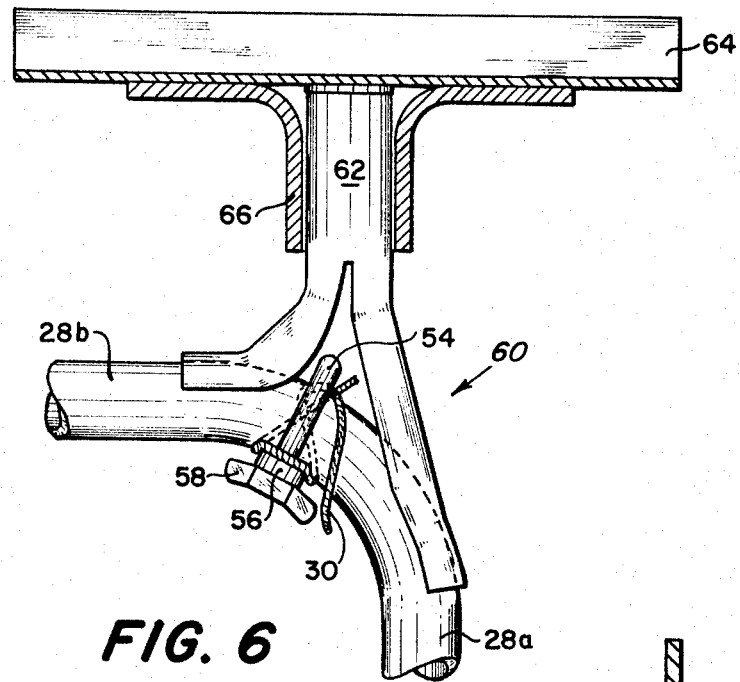
FIGURE 6 is a detailed view of the boat loader of the present invention which also shows the manner of attaching the tension members to the upright frames of the present invention.
Figure 6A:
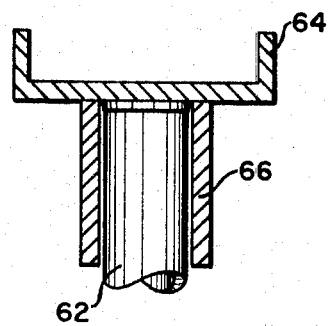
FIGURE 6a is another view of the boat loader of FIGURE 6.

At each end of the tension members 30, where the members 30 contact parts of the automobile body or frame, the tension members 30 have a protective tubing 52 placed thereover. The protective tubing 52 can be formed of a flexible material such as neoprene to protect the finish of the automobile. On each frame member 26 and 28 two U-clamps 54, shown in detail in FIGURE 6, are positioned around the tubular frames and through a plate 56. The plate 56 is maintained on the U-clamp 54 by wing nuts 58. The U-clamps 54 form the connection between the tension members 30 and the frames 26 and 28.

With the foregoing constructional details of the rack of the present invention in mind, it will be seen that in order to install the rack on an automobile, the front deck lid 18 and the rear deck lid 20 of the automobile are first opened. The upright frames 26 and 28 are positioned forwardly of the windshield 14 and rearwardly of the roof 16, respectively, so that the feet 32 of the frames contact the automobile body 12 and so that the flexible anchors 40 of the feet 32 are disposed within the rain channels 42 which surround the deck lid openings. The two tension members 30 are then hooked under the rear bumper 24 of the automobile. The tension members are brought forwardly to the U-clamps 54 secured on rear frame 28. Tension members are then looped about the U-clamps 54. To accomplish this looping, a bight is formed on the tension member and the bight is passed between the U-clamp and the frame 28. The bight is then pulled through and looped around the wing nuts 58. The tension member is then drawn forward to the forward frame 26 where a second bight is formed and it is looped around the U-clamp 54 in the front frame 26. This procedure is accomplished for both tension members 30. The tension members 30 are so located that, with the deck lids still opened, the tension members fit along the rain channels 42 of the deck lids. The tension members 30 are then drawn forwardly from the rack 26 and are hooked under the front bumper 22 of the automobile.

The tension of the tension members 30 is adjusted by the use of the belt webbing straps 44 and buckles 50 so that the tension members are not quite taut.

With the rack in this condition, the deck lids 18 and 20 of the automobile are closed. The closing of the deck lids accomplishes two purposes. First, the deck lids 18 and 20 capture the flexible anchors 40 to prevent the feet 32 of the frames 26 and 28 from wandering under variable conditions of acceleration and movement of the automobile. Further, since the tension members 30 are disposed along the rain channels 42 surrounding the deck lids 18 and 20, closing of the deck lids increases the tension on the tension members so that the entire rack is thus made very rigid.

Although the rack of the present invention can be utilized for many different types of loads, it is particularly useful for hauling boats on an automobile. The rack has a boat loader 60, shown in detail in FIGURE 6, which facilities loading of the boat on the rack. The boat loader 60 has an upright pivot bar 62 fixed to one corner of rear rack 28. The pivot bar rotatably receives a cradle 64 that has a tubular journal 66 fixed thereto. The cradle 64 and the journal 66 are removable from the pivot bar 62 and also freely rotate relative to the pivot bar 62 when the cradle 64 and journal 66 are positioned on the pivot bar 62.

As seen in FIGURE 2, a boat 68 is shown in phantom lines. To load a boat on the rack, the boat is positioned on the ground perpendicular to the longitudinal axis of the automobile. One end of the boat is then lifted and placed on the cradle 64 of the boat loader 60. The person then walks to the front of the boat and lifts the front of the boat and carries the front of the boat toward the front of the automobile. By so carrying, the cradle 64 rotates on the pivot bar 62 so that the boat may pivot while the rear end of the boat is held on the cradle. The front end of the boat may thus be placed upon the cross member 26b of front frame 26. After the front of the boat is in position, the person loading the boat returns to the rear frame 28 and lifts the boat from the boat loader cradle 64 and places it on the rear cross member 28b. Thus, it can be seen that one person can load a relatively large and heavy boat on the rack of the present invention with this novel boat loader.

Figure 7:
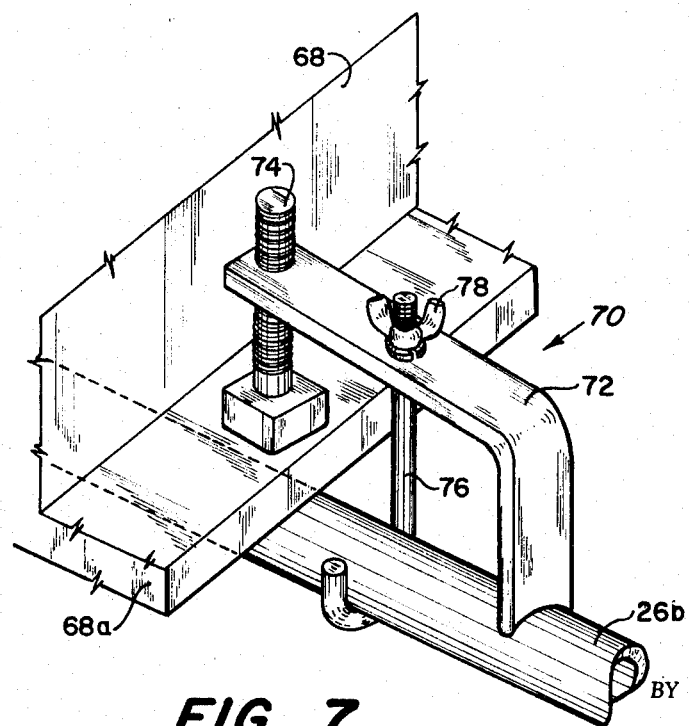
FIGURE 7 is a perspective view, to an enlarged scale, of the boat clamp utilized with the rack of the present invention.

In FIGURE 7 is shown a novel clamp 70 for clamping a boat in place on the rack of the present invention. The clamp 70 has a right angle brace 72, one end of which abuts the cross piece 26b or 28b of the respective frames 26 and 28. A gunwales engaging bolt 74 is threaded through the right angle brace 72 so that the head of the bolt 74 is a distance away from the cross piece 26b sufficient to clamp the gunwale 68a of the boat to the cross piece 26b. A hook 76 extends upwardly through the right angle brace 72 and is secured in position by a wing nut 78. Thus, after the boat is on the rack, the clamp 70 is placed adjacent the boat, the gunwales engaging bolt 74 is positioned or adjusted so that it will clamp the gunwales of the boat between the rack 26 and the head of the bolt 74. The hook 76 is then hooked under the cross piece 26b and placed through a hole in the right angle brace 72. The wing nut 78 is then tightened and the boat is thus clamped to the rack. Four clamps 70 are used with the rack of the present invention to clamp a boat to the rack.

According to the provisions of the patent statutes, I have explained the principle, preferred construction and mode of operation of my invention and have illustrated and described what I now consider to represent its best embodiment. However, I desire to have it understood that, within the scope of the appended claims, the invention may be practiced otherwise than as specifically illustrated and described.

I claim:

1. A removable, load-supporting rack for an automobile having a body, a windshield, a roof, a front deck lid, a rear deck lid and front and rear bumpers wherein no portion of said rack is supported by said automobile roof, said rack comprising:
(a) a first weight-bearing frame removably positioned upright on said automobile body forwardly of said windshield;
(b) a second weight-bearing frame removably positioned upright on said automobile body rearwardly of said automobile roof;
(c) means to removably fix said first and second weight-bearing frames in position on said automobile body; and
(d) a plurality of tension members removably connecting said first and second weight-bearing frames to each other and to the front and rear bumpers of said automobile to maintain said frames in an upright position under variable conditions of automobile movement, acceleration and deceleration.

2. The removable, load-supporting rack of claim 1 wherein said first and second weight-bearing frames and said tension members are so positioned that the roof of a convertible automobile upon which said rack is mounted may be raised and lowered without interference from said rack.

3. The removable, load-supporting rack of claim 1 wherein said tension members are formed from steel cable having protective flexible tubing over the portions contacting said automobile body, with hooks and belt webbing on the front end thereof to facilitate fastening said tension members to said automobile bumpers, said steel cables being looped around said first and second frame members.

4. The removable, load-supporting rack of claim 1 wherein said first and second weight-bearing frames each have feet formed thereon, said feet adapted to contact the body of said automobile and having anchor members flexibly attached thereto and adapted to be received within the rain channels surrounding the deck lid openings of said automobile to serve as said means to removably fix said first and second weight-bearing frames in position on said automobile body.

5. The removable, load-supporting rack of claim 1 wherein said first and second weight-bearing frames and said tension members are so positioned that the roof of a convertible automobile upon which said rack is mounted may be raised and lowered without interference from said rack; said tension members being formed from steel cable having protective flexible tubing over the portions contacting said automobile body, with hooks and belt webbing on the front end thereof to facilitate fastening said tension members to said automobile bumpers, said steel cables being looped around said first and second tension members, and said first and second weight-bearing frames each having feet formed thereon, said feet adapted to contact the body of said automobile and having anchor members flexibly attached thereto and adapted to be received within the rain channels surrounding the deck lid openings of said automobile to serve as said means to removably fix said first and second weight-bearing frames in position on said automobile body.

6. The removable, load-supporting rack of claim 1 wherein one of said weight-bearing frames has a vertical pivot bar adapted to removably receive a boat loading cradle having a tubular journal fixed thereto, said tubular journal permitting free rotation of said cradle relative to said weight-bearing frame.

7. The removable, load-supporting rack of claim 1 wherein a boat is clamped to said rack by a plurality of clamps having a right angle brace with one end of said brace abutting a cross member of said rack, a gunwale contacting member is adjustably positioned relative to said brace, and said brace is retained against said rack by a threaded hook which hooks around said rack and extends upwardly through said right angle brace and is retained thereon by a wing nut.

8. The removable, load-supporting rack of claim 1 wherein one of said weight-bearing frames has a vertical pivot bar adapted to removably receive a boat loading cradle having a tubular journal fixed thereto, said tubular journal permitting free rotation of said cradle relative to said weight-bearing frame; said boat being clamped to said rack by a plurality of clamps having a right angle brace with one end of said brace abutting a cross member of said rack, a gunwale contacting member is adjustably positioned relative to said brace, and said brace is retained against said rack by a threaded hook which hooks around said rack and extends upwardly through said right angle brace and is retained thereon by a wing nut.

9. The removable, load-supporting rack of claim 1 wherein said tension members are positioned within the rain channels surrounding the respective deck lid openings of said automobile while said deck lids are in the open position so that when said deck lids are closed, the rigidity of said tension members in retaining said first and second weight-bearing frames in an upright position is increased.

10. The removable, load-supporting rack of claim 1 wherein said first and second weight-bearing frames each have feet formed thereon, said feet adapted to contact the body of said automobile and having anchor members flexibly attached thereto and adapted to be received within the rain channels surrounding the deck lid openings of said automobile to serve as said means to removably fix said first and second weight-bearing frames in position on said automobile body; said tension members being positioned within the rain channels surrounding the respective deck lid openings of said automobile while said deck lids are in the open position so that when said deck lids are closed, the rigidity of said tension members in retaining said first and second weight-bearing frames in an upright position is increased.

References Cited by the Examiner
UNITED STATES PATENTS

| | | | |
|---|---|---|---|
| 2,537,587 | 1/1951 | Humphrey | 224—42.03 |
| 2,594,319 | 4/1952 | Law. | |
| 2,785,816 | 3/1957 | Fisher | 214—450 |

GERALD M. FORLENZA, *Primary Examiner.*

F. E. WERNER, *Assistant Examiner.*